INVENTORS
JOHN A. DAVIS JR.
WILLIAM J. KUNZMAN

ATTORNEY

3,508,611
Patented Apr. 28, 1970

3,508,611
MOLECULAR WEIGHT OF HYDROCARBON INFLUENCING THE THERMOSTABILITY OF A MICELLAR DISPERSION
John A. Davis, Jr., and William J. Kunzman, Littleton, Colo., assignors to Marathon Oil Company, Findlay, Ohio, a corporation of Ohio
Filed July 22, 1968, Ser. No. 746,390
Int. Cl. E21b 43/16, 47/00
U.S. Cl. 166—252                                    20 Claims

ABSTRACT OF THE DISCLOSURE

The thermostability of a micellar dispersion composed of hydrocarbon, aqueous medium, and surfactant can be shifted to higher temperature ranges by using a low molecular weight hydrocarbon as the hydrocarbon component of the dispersion. Such micellar dispersions are useful in a process for recovering oil from an oil-bearing subterranean formation having at least one production well and at least one injection well in fluid communication therewith, the process effected by determining the temperature of the formation, injecting into the formation a stabilizable mixture of micellar dispersion constituents comprised of hydrocarbon, surfactant, and aqueous medium, characterized in that the hydrocarbon has a sufficiently low molecular weight to stabilize the mixture as a micellar dispersion at the formation temperature, displacing the dispersion through the formation and recovering crude oil through the production well.

BACKGROUND OF THE INVENTION

The prior art teaches that micellar dispersions are useful as miscible-type displacing agents to recover crude oil from subterranean formations. Gogarty et. al. in U.S. Patent No. 3,254,714 teaches that a microemulsion is useful in flooding subterranean formations to recover crude oil. Micellar dispersions, including microemulsions, are differentiated from emulsions in that the former are thermodynamically stable and are generally transparent whereas emulsions are not thermodynamically stable and are generally opaque. However, micellar dispersion may become an emulsion due to a large temperature change.

Reservoir temperatures tend to vary greatly due to the reservoir characteristics. For example, a reservoir with an active aquifer can have reasonably low temperatures at great depths. However, it is generally accepted within the petroleum industry that the normal subsurface temperature gradient is about 1° F. per 60 feet. Thus, at reservoir depths of about 4,000 feet, temperatures up to and above about 150° F. are possible. In order to effect an efficient miscible-type flooding operation with a micellar dispersion at such temperatures, the dispersion is preferably designed to be thermally stable at the particular formation temperature. The term "thermostability" as used herein means thermodynamically stable, i.e. a system below or above the thermostability temperature range will exhibit two or more distinct layers or phases, indicating an unstable system or an emulsion.

SUMMARY OF THE INVENTION

Applicants have discovered that a micellar dispersion composed of hydrocarbon, water, and surfactant can be designed to be thermally stable at the formation temperature by designing the molecular weight of the hydrocarbon within the dispersion to impart thermostability to the dispersion at the temperature of the formation.

DESCRIPTION OF THE DRAWINGS

The drawings illustrate the thermostability temperature range of micellar dispersion containing 55.9% hydrocarbon (amounts of kerosense and straight-run gasoline are indicated on horizontal axis of the drawings), 30.0% water, 10.6% sodium petroleum sulfonate having an average molecular weight of about 470 and being about 62 percent active sulfonate, 3.5% isopropyl alcohol, and 3% (FIGURE 2), 6% (FIGURE 1) and 9% (FIGURE 3) Na$_2$SO$_4$ as indicated in the drawings. The average molecular weights of the straight-run gasoline and kerosene are 95 and 175, respectively.

DESCRIPTION OF THE INVENTION

Figure 1:
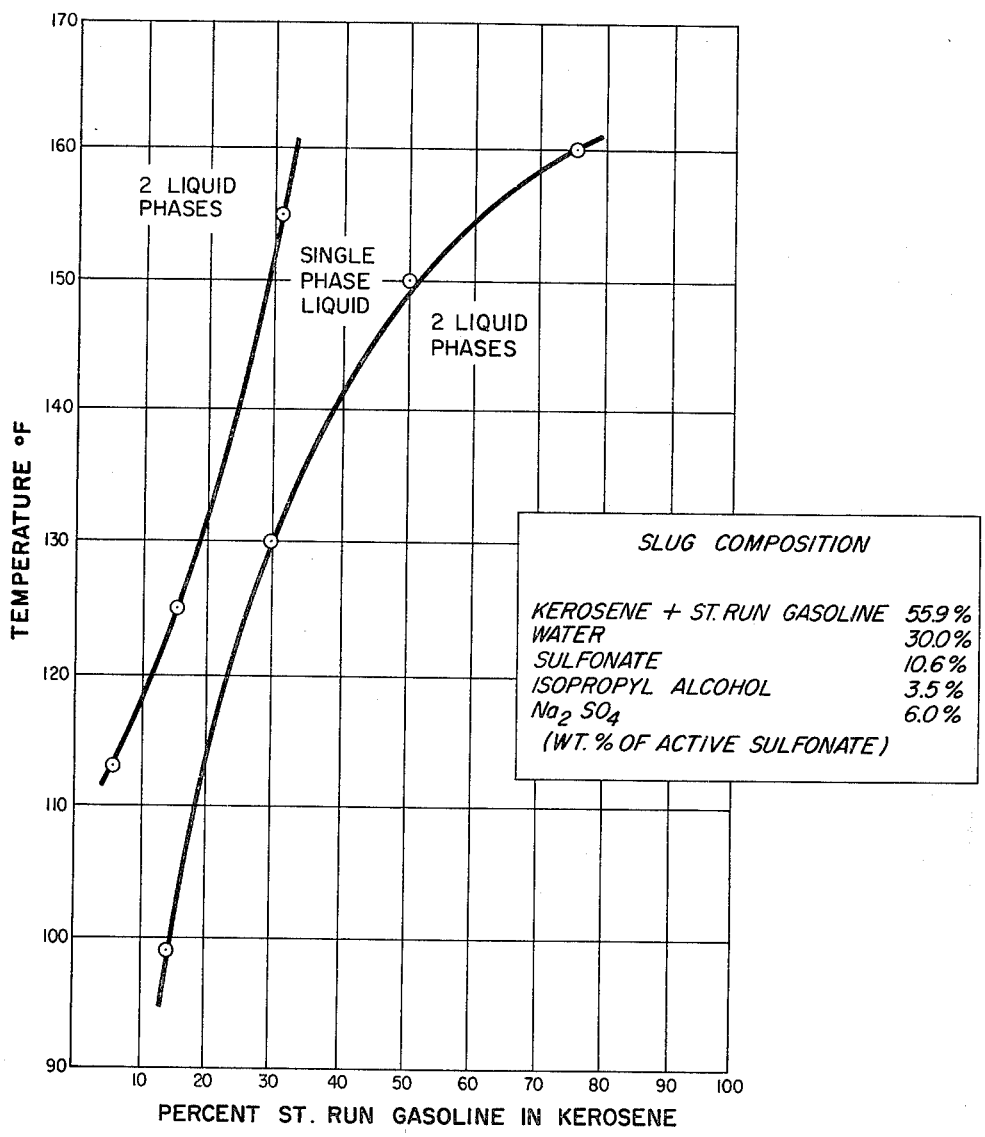
FIGURES 1, 2, and 3 indicate that as the percent of straight-run gasoline is increased within the hydrocarbon component, the thermostability range of the micellar dispersion is shifted to higher temperatures.
Figure 2:
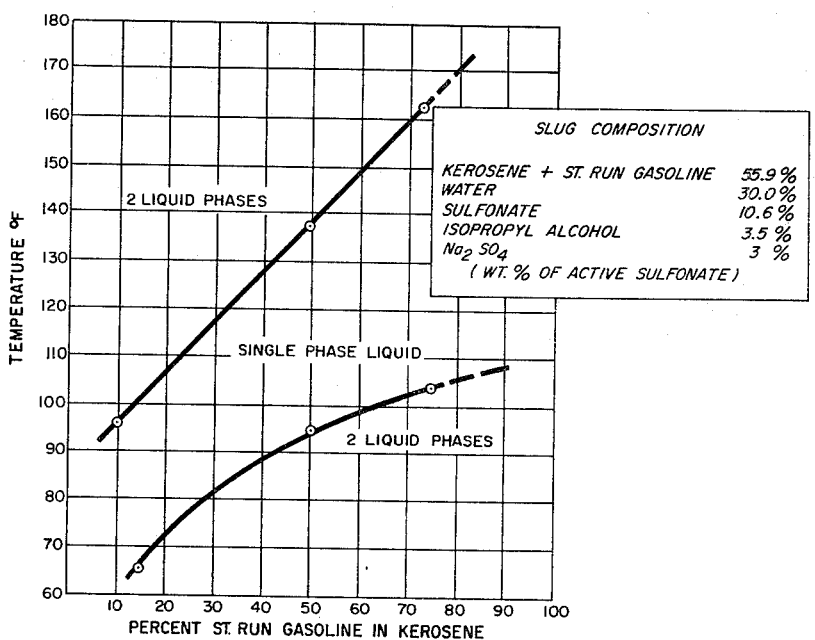
Figure 3:
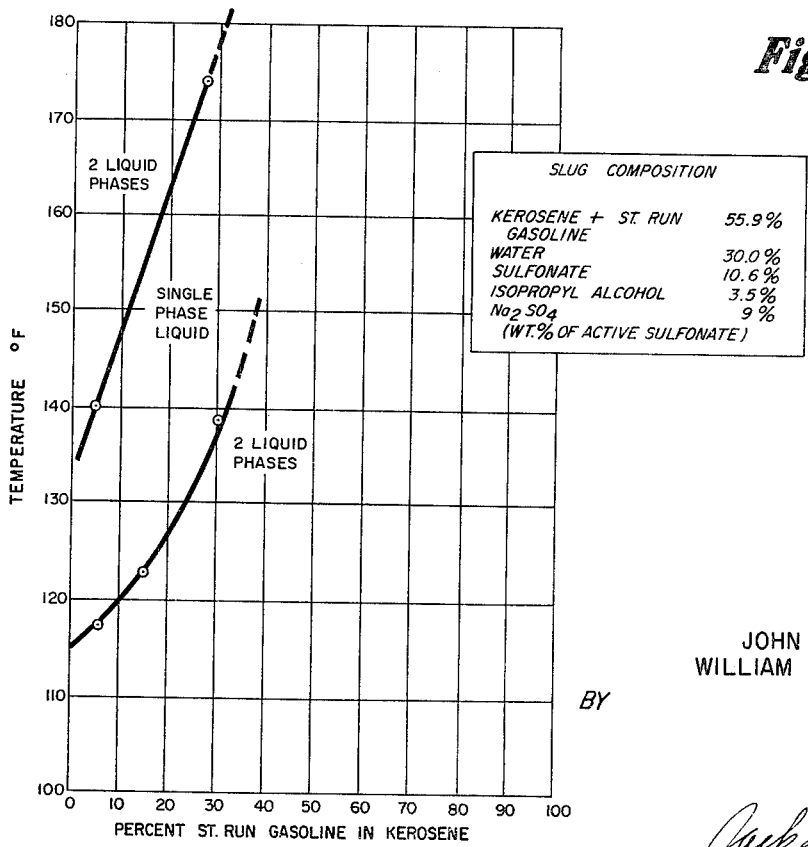

The micellar dispersions useful in this invention are composed of hydrocarbon, aqueous medium, and surfactant sufficient to impart micellar dispersion characteristics to the dispersion. In addition, cosurfactant(s) and electrolyte(s) are optionally useful in the micellar dispersion. Examples of volume amounts include from about 5% to about 70% hydrocarbon, from about 20% to about 90% aqueous medium, at least about 4% surfactant, from about 0.01% to about 20% or more cosurfactant and from about 0.01% to about 5% or more, based on aqueous medium, of electrolyte.

The term "micellar dispersion" as used herein is meant to include micellar solutions, microemulsions, oleopathic hydro-micelles, "transparent" emulsions, "fine" emulsions, and micellar solution technology taught in C. G. Sumner, Clayton's, The Theory of Emulsions and Their Technical Treatment, Fifth Edition, pp. 315–320 (1954). The examples of useful micellar solutions include those defined in U.S. Patent Nos. 3,254,714 to Gogarty et al.; 3,275,075 to Gogarty et al.; 3,301,325 to Gogarty et al.; and 3,307,628 to Sena. Additional examples of micellar dispersions are taught in U.S. Patent No. 3,348,611 to Reisberg. The micellar dispersion of this invention can be oil-external or water external.

Hydrocarbons useful in the micellar dispersions include crude oil (both sweet and sour) partially refined fractions of crude oil, and refined fractions thereof. Specific examples include side cuts from crude oil columns, overheads from crude columns, gas oils, kerosene, heavy naphthas, naphthas, straight-run gasoline, and liquefied petroleum gases. Refined hydrocarbons are also useful, e.g. paraffin compounds including propane, pentane, heptane, decane, dodecane, etc.; cycloparaffins including cyclohexane and substituted products of the cycloparaffins; aryl compounds including benzene, naphthalene, anthracene, etc. and alkylated products thereof such as toluene, etc. Preferably, the hydrocarbon is a lower molecular weight hydrocarbon and is one locally available. Also, the hydrocarbon should not impart a bubble point pressure to the micellar dispersion which is less than the pressure the dispersion is subjected to.

The aqueous medium can be soft, brackish, or a brine. Preferably, the water is soft, but it can contain small amounts of salts which are compatible with the ions within the subterranean formation being flooded.

Surfactants useful with the dispersions include nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate. Other useful surfactants include Duponol WAQE (a 30% active sodium lauryl sulfate marketed by Du Pont Chemical Corporation, Wilmington, Del.), Energetic W–100 (a polyoxyethylene alkyl phenol marketed by Armour Chemical Company, Chicago, Ill.), Triton X–100 (an alkylphenoxy polyethoxy ethanol marketed by Rohm & Haas, Philadelphia, Pa.) and Arquad 12–50 (a 50% active dodecyl trimethyl ammonium chloride marketed by Armour Chemical Company, Chicago, Ill.), and like materials.

Petroleum sulfonates (i.e. surfactants) are also useful with the dispersion, they are also known as alkyl aryl naphthenic sulfonates. Such can be obtained by sulfonating at least a portion of a sulfonatable hydrocarbon (e.g. gas oils) and then neutralizing the mixture, e.g. with NH$_4$OH, NaOH, etc. The sulfonate can contain, after extraction, e.g. 60–100% active sulfonate. Unsulfonated hydrocarbon within the sulfonates is useful as the hydrocarbon within this invention. Examples of preferred surfactants are the sodium and ammonium petroleum sulfonates having an average molecular weight of from about 360 to about 520, and more preferably from about 420 to about 470. The sulfonate can be a mixture of low and high molecular weight sulfonates. Surfactants of like character are also useful.

The cosurfactants, also known as cosolubilizers or semipolar organic compounds, useful with this invention include alcohols, amino compounds, esters, aldehydes and ketones containing from 1 to about 20 or more carbon atoms and more preferably from about 3 to about 16 carbon atoms. The cosurfactant is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include the primary butanols, primary pentanols and primary and secondary hexanols. Concentrations within the range of from about 0.01% to about 20% or more by volume of cosurfactant are useful in the micellar dispersion and more preferably from about 0.1 to about 5.0%. Mixtures of two or more cosurfactants are useful.

Examples of electrolytes include inorganic bases, inorganic acids, inorganic salts, organic bases, organic acids, and organic salts which are strongly or weakly ionized. Preferably, the electrolytes are inorganic bases, inorganic acids, and inorganic salts, e.g. sodium hydroxide, sodium chloride, sodium sulfate, hydrochloric acid, sulfuric acid, and sodium nitrate. Examples of other useful electrolytes can be found in U.S. Patent No. 3,330,343. The type and concentration of electrolyte will depend on the aqueous medium, surfactant, cosurfactant, and hydrocarbon. Generally from about 0.1% to about 4% or more by weight of electrolyte is useful, percents based on aqueous medium. The electrolyte can be the salts within brackish or brine water.

The mobility of the oil-external micellar dispersion is desirably about equal to or less than the mobility of the formation fluids (i.e. combination of crude oil and interstitial water) ahead of the dispersion. Preferably, the micellar solution has a mobility favorable to protecting against viscous instability.

Size of the micellar dispersion slug useful with this invention is from about 1% to about 20% formation pore volume. Larger pore volumes are useful but such may be economically unattractive. More preferably, from about 2% to about 10% formation pore volumes are useful and from about 3% to about 6% formation pore volumes give very efficient results.

As mentioned previously, the thermostability of the micellar dispersion is shifted to higher temperatures by incorporating a low molecular weight hydrocarbon within the micellar dispersion. Such a thermostability temperature range can be adjusted to meet the needs of the particular reservoir conditions by incorporating within the hydrocarbon component of the dispersion a percentage of a lower molecular weight hydrocarbon to obtain the desired thermostability temperature range. For example, a 50/50 mixture ratio of kerosene to straight-run gasoline can be used as the hydrocarbon component within the micellar dispersion to give a thermostability range higher than one obtained using only the kerosene.

This invention is not to be limited by the specifics taught herein. Rather, all equivalents obvious to those skilled in the art are meant to be included within the scope of the invention as defined in the specfication and appended claims.

What is claimed is:

1. A process of recovering crude oil from an oil-bearing subterranean formation having at least one production means in fluid communication with at least one injection means, comprising determining the temperature of the formation, injecting into the formation a micellar dispersion comprised of hydrocarbon, surfactant, and aqueous medium, characterized in that the hydrocarbon has a sufficiently low molecular weight to impart thermostability to the mixture of micellar dispersion constituents at the formation temperature and displacing the stabilized micellar dispersion through the formation to recover crude oil through the production means.

2. The process of claim 1 wherein the stabilized mixture of micellar dispersion constituents contains a cosurfactant.

3. The process of claim 1 wherein the stabilizable mixture of micellar dispersion constituents contains electrolyte.

4. The process of claim 1 wherein the formation temperature is in excess of about 80° F.

5. The process of claim 1 wherein the formation temperature is in excess of about 150° F.

6. The process of claim 1 wherein the formation temperature is in excess of about 200° F.

7. The process of claim 1 wherein the surfactant is a petroleum sulfonate.

8. The process of claim 1 wherein the lower molecular weight hydrocarbon is straight-run gasoline.

9. A process of recovering crude oil from an oil-bearing subterranean formation having at least one production means and one injection means therein, comprising determining the temperature of the formation to be in excess of about 80° F., injecting in the formation a micellar dispersion comprised of hydrocarbon, petroleum sulfonate, aqueous medium, and cosurfactant characterized in that the hydrocarbon has sufficient low molecular weight to stabilize the mixture of micellar dispersion constituents at the formation temperature, displacing the micellar dispersion through the formation, and recovering crude oil through the production means.

10. The process of claim 9 wherein the formation temperature is in excess of about 150° F.

11. The process of claim 9 wherein the formation temperature is in excess of about 200° F.

12. The process of claim 9 wherein the low molecular weight hydrocarbon is straight-run gasoline.

13. The process of claim 9 wherein the cosurfactant is alcohol.

14. The process of claim 9 wherein the mixture of micellar dispersion constituents contains electrolyte.

15. A method of shifting the thermostability of a micellar dispersion comprised of hydrocarbon, surfactant, and aqueous medium to temperatures in excess of about 80° F., the method comprising incorporating a sufficient amount of a low molecular weight hydrocarbon into the mixture of micellar dispersion constituents to impart thermostability at the temperatures in excess of 80° F.

16. The method of claim 15 wherein the mixture contains cosurfactant.

17. The method of claim 15 wherein the mixture contains electrolyte.

18. The method of claim 15 wherein the surfactant is a petroleum sulfonate.

19. The method of claim 15 wherein the temperature is in excess of about 150° F.

20. The method of claim 15 wherein the temperature is in excess of about 200° F.

References Cited

UNITED STATES PATENTS

| | | | |
|---|---|---|---|
| 3,041,275 | 6/1962 | Lummus et al. | 252—309 X |
| 3,170,514 | 2/1965 | Harvey et al. | 166—275 |
| 3,234,143 | 2/1966 | Waldmann | 252—309 |
| 3,244,638 | 4/1966 | Foley et al. | 252—8.5 X |
| 3,254,714 | 6/1966 | Gogarty et al. | 166—274 |
| 3,266,570 | 8/1966 | Gogarty | 166—273 |
| 3,275,075 | 9/1966 | Gogarty et al. | 166—274 |
| 3,297,084 | 1/1967 | Gogarty et al. | 166—274 X |
| 3,330,343 | 7/1967 | Tosch et al. | 166—274 X |
| 3,348,611 | 10/1967 | Reisberg | 166—274 X |
| 3,373,809 | 3/1968 | Cooke | 166—274 X |

STEPHEN J. NOVOSAD, Primary Examiner

U.S. Cl. X.R.

166—275; 252—8.55, 309, 312